United States Patent

[11] 3,618,969

| [72] | Inventor | John J. Glassmeyer<br>Covington, Ky. |
|---|---|---|
| [21] | Appl. No. | 30,739 |
| [22] | Filed | Apr. 22, 1970 |
| [45] | Patented | Nov. 9, 1971 |
| [73] | Assignee | Pullman Incorporated<br>Chicago, Ill. |

[54] APPARATUS FOR POSITIONING TRAILER SUSPENSION FRAME
16 Claims, 6 Drawing Figs.

| [52] | U.S. Cl. | 280/80 B, 280/405 A |
|---|---|---|
| [51] | Int. Cl. | B62d 53/06 |
| [50] | Field of Search | 280/81, 80, 405 |

[56] References Cited
UNITED STATES PATENTS

| 2,841,411 | 7/1958 | Sheppard et al. | 280/80 |
| 2,935,332 | 5/1960 | Delay | 280/81 |
| 2,962,295 | 11/1960 | Tenenbaum | 280/80 |
| 3,043,605 | 7/1962 | McKay | 280/81 |
| 3,379,453 | 4/1968 | Fujioka | 280/81 |

*Primary Examiner*—Kenneth H. Betts
*Attorneys*—Hilmond O. Vogel and Wayne Morris Russell ABSTRACT: An apparatus for selectively positioning the sliding suspension frame or bogie relative to the trailer underframe including a bogie-locking assembly having handle and linkage operated spring-loaded locking pins for registering with holes in fixed suspension rails attached to the trailer underframe wherein the handle is provided with a latch pin which is held against a slotted latch plate against the action of the locking pin springs, the handle having a rotating dial, which indicates the desired amount of bogie shifting, positioned to be rotated by a star wheel driven by movement of the trailer frame relative to the bogie such that when the trailer has moved a sufficient distance, and the star wheel thereby rotated, the latch pin on the handle is allowed to pass through the slotted latch plate to permit the locking pins to engage the openings in the fixed suspension rails to prevent any further relative movement between the trailer frame and the bogie.

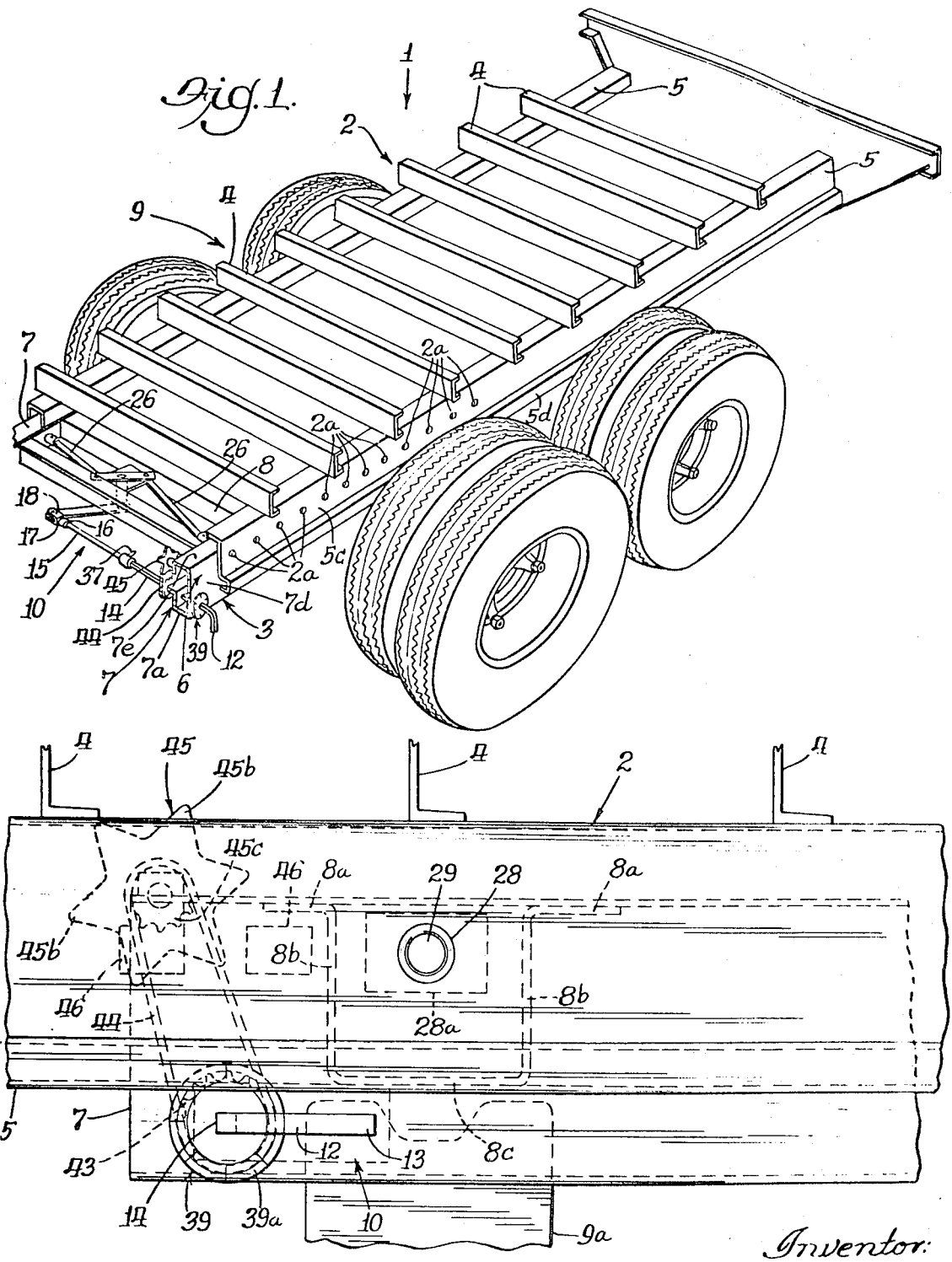

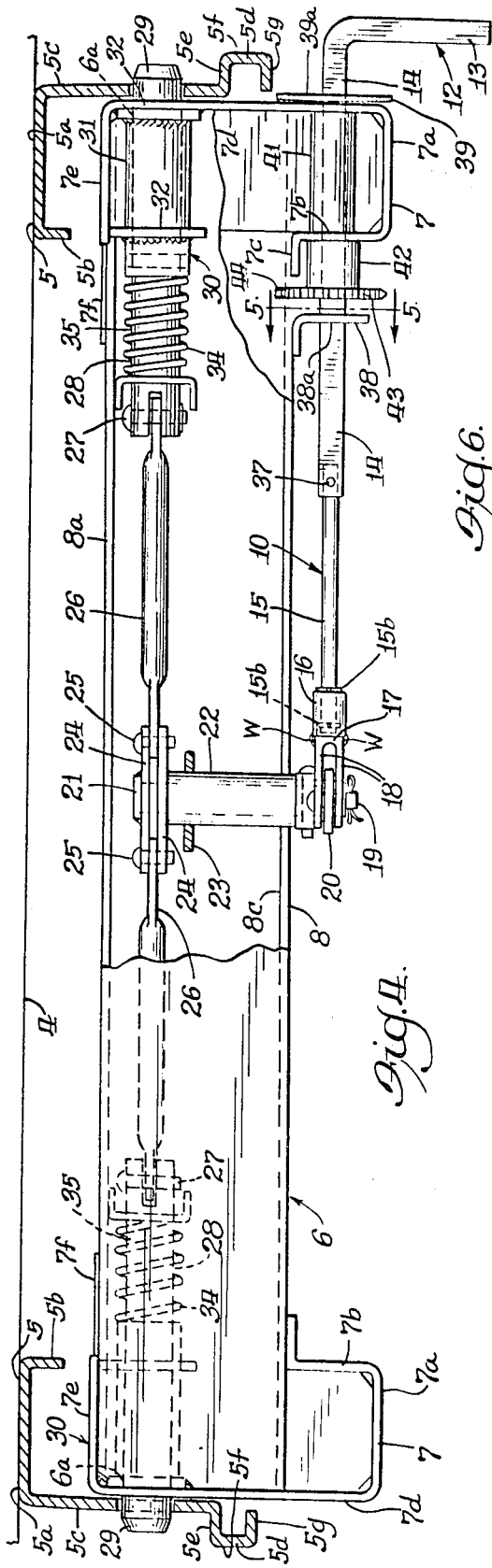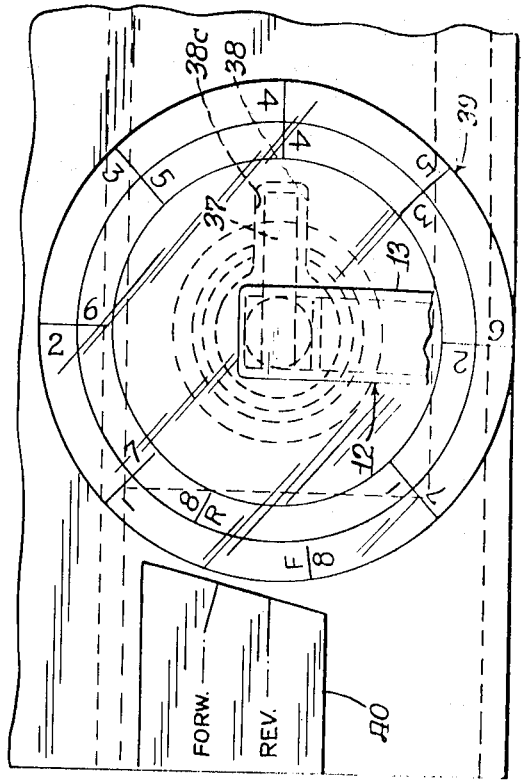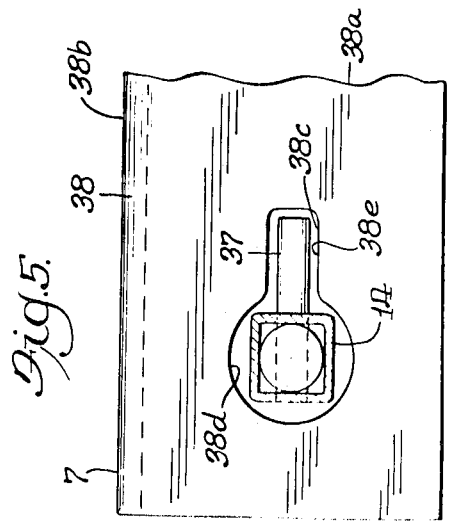

APPARATUS FOR POSITIONING TRAILER SUSPENSION FRAME

SUMMARY OF THE INVENTION

This invention is concerned with an improved apparatus for preselecting the position to which a sliding trailer suspension frame is to be repositioned. Presently available devices usually involve the use of a movable cam, attached to the suspension fixed rail which cam trips a latch when the release handle contacts it. If no preselect device is used, repositioning of the sliding frame or bogie requires the use of a locater bar or else repositioning becomes a matter of guesswork.

The invention disclosed herein permits the operator to easily and accurately program the movement of his slider or bogie forward or backward in specific measured increments or multiples thereof, by aligning the desired calibration on a rotating dial with a fixed indicator.

It is, therefore, a general object of this invention to provide for position locking and indicating means on a semitrailer for locking of the trailer frame relative to its movable bogie or sliding suspension frame.

A further object of this invention is to provide for a locking assembly for locking of the bogie to the trailer underframe wherein a handle and lever assembly locates pins in openings in the fixed suspension rails and bogie frame wherein an indicating dial position structure is mounted on the handle and after being set the dial structure is rotated by means of a chain and sprocket drive operated by means of a star wheel on the bogie which is rotated by movement of the trailer underframe relative to the bogie.

These and other objects of the invention will become apparent from reference to the following description, attached drawings, and appended claims.

BRIEF DESCRIPTION OF THE DRAWINGS

FIG. 1 is a perspective view of a trailer including the trailer underframe, and the bogie or sliding frame therefor;

FIG. 2 is a side elevational view of the locking and positioning apparatus for a sliding bogie frame;

FIG. 4 is a plan sectional view device shown in FIG. 3 with parts broken away;

FIG. 5 is a sectional view taken along line 5—5 of FIG,. 4; and

FIG. 6 is an enlarged view of the indicating dial arrangement of the device.

DETAILED DESCRIPTION

Figure 3:
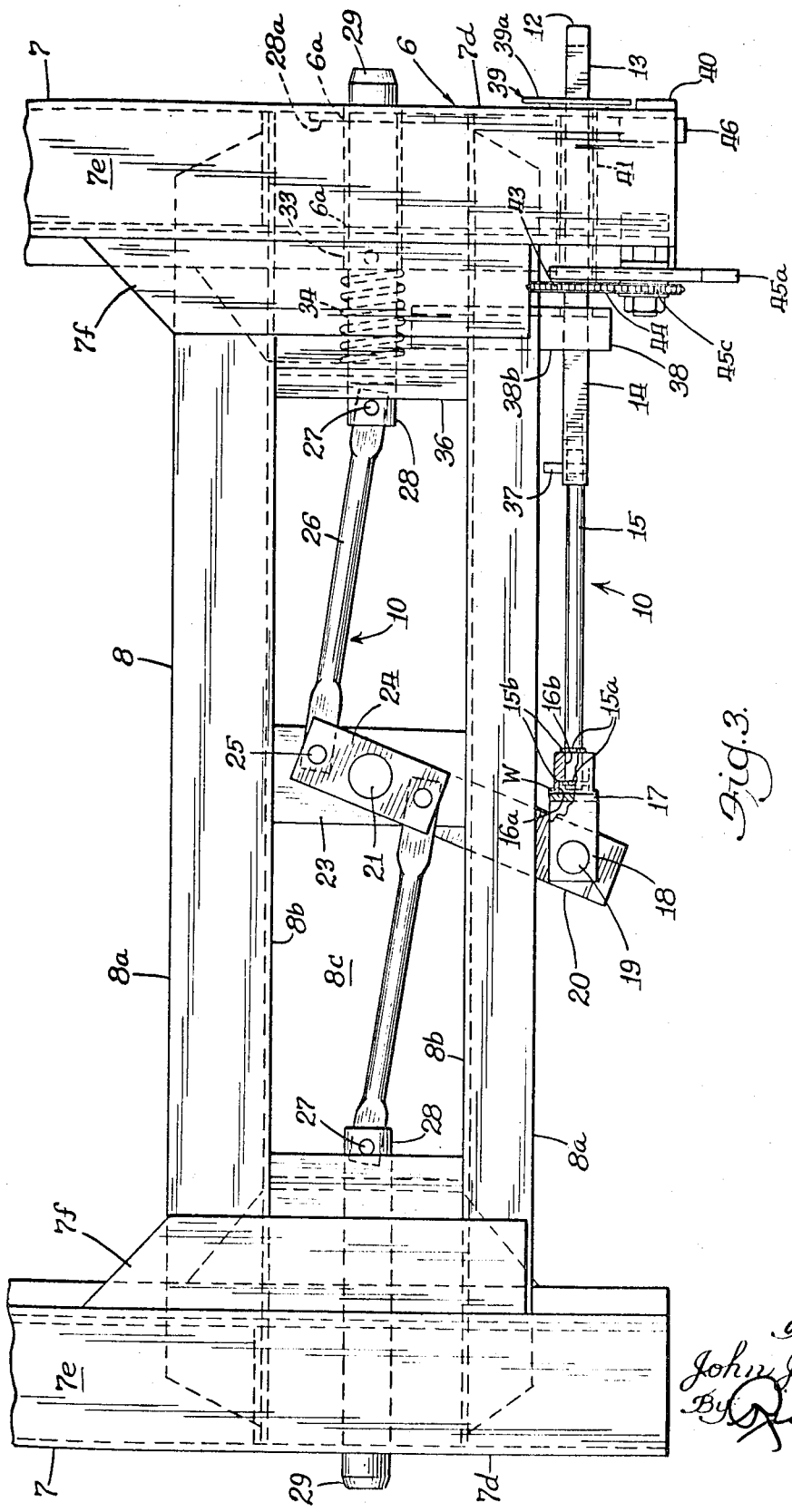
FIG. 3 is a plan view of the bogie frame provided with the locking trailer frame to bogie arrangement and the position indicating structure.

With reference now to the drawings and in particular with reference to FIG. 1, there is shown a trailer 1 having a trailer underframe or chassis 2 supported on a bogie assembly 3. The trailer underframe is provided with channel-shaped crossmembers or bolsters 4 and with suspension fixed rails 5 which extend longitudinally as side members. Each underframe rail 5 includes a top horizontal flange 5a, a short vertical inner end flange 5b and an upper vertical outside flange 5c. Depending from the flange 5c is the lower C-shaped portion 5d having an upper horizontal portion 5e, a vertical portion 5f and a lower portion 5g (as best seen in FIG. 4). The bogie assembly 3 is provided with the bogie subframe rails or side frames 7 which are generally G-shaped and include a bottom flange 7a, an inside lower vertical flange 7b, a lower horizontal flange 7c, and an outer vertical flange 7d, and an upper horizontal flange 7e (as seen in FIGS. 2–4). Top tie plate 7f ties the bogie side frames to the bogie crossmembers or hat-section members 8. Each hat-section member 8 includes an upper horizontal end flange 8a, a vertical web 8b and a lower horizontal flange 8c, as best seen in FIG. 2. The bogie assembly 3 further includes bogie wheels 9 and the front spring hanger 9a (see FIG. 2) for the bogie suspension spring (not shown).

The bogie assembly 3 is locked to the trailer underframe 2 by the bogie-locking assembly 10 which locks, by the means of pins, the bogie subframe to the trailer underframe. The assembly 10 has a handle 12 with a vertical end portion 13 and a horizontal portion 14 which has a rectangular tabular cross section that connects with round rod 15. The rod 15 at its left end (see FIG. 4) is provided with a pair of spaced grooves 15a receiving C rings 15b which engage opposite sides of the shoulder 16b which has a reduced bore 16c to receive the portion of the rod 15 between the C rings 15b. The sleeve 16 is provided with an enlarged bore 16a which at the left end of the collar or sleeve 16 is welded to the right end of the yoke 17 which has upper and lower arms 18 pivotally connecting with the lower lever 20 by means of pivot pin means 19 (see FIGS. 3 and 4). This construction of the collar or sleeve 16 and the rod 15 permits the handle 14 and the rod 15 to reciprocate and rotate but only allows the yoke 17 to pivot about pivot pin means 19. Thus, the C rings allow for rotation of the rod 15 but with shoulder or end member 16b prevent endwise movement of the rod 15 with respect to the sleeve 16. The welds w hold the yoke 17 to the sleeve 16. Though the yoke 17 and the sleeve 16 do not rotate, the yoke 17 and sleeve 16 permit the lower lever 20 to rotate or pivot shaft 21 about its vertical axis. The arrangement of the parts 15, 16 and 17 thus permit a rotation of the handle assembly by rotation of the dial assembly and for subsequent rotation of the star wheel assembly to rotate the handle assembly. Yet only transverse reciprocating action of the locking pins 28 is permitted, the operation thereof being described below. The lower lever 20 is fixedly attached to the vertical pivot shaft 21 for rotation thereof carried in support tube 22 that is welded to the bogie crossmember at the bottom, the vertical pivot shaft 21 being rotatable within the support tube 22. A horizontal support plate 23 which is connected to the crossmember 8 further supports the tube 22. A pivot plate 24 is fixedly mounted on top of the pivot shaft 21 and pivotally connects at its outer ends by means of pivot pin means 25 with each of the opposed pin links or arms 26 pivotally connected at respective pivot means 27 to opposed locking pins 28. Each of the locking pins 28 is extendable through bogie aperture means 6a of a respective bogie subframe rail 7 and into one selected trailer underframe rail aperture means 2a of a plurality of such underframe rail apertures in each of the underframe rails (see FIG. 1). As seen in FIG. 3, the outer vertical flange 7d of the bogie subframe rail 7 on the inside thereof is provided with a reinforcement plate 28a which is provided with bogie rail aperture means 6a. As seen in FIGS. 2, 3, and 4, the locking pins 28 have a conical or tapered portion 29. Each locking pin 28 is reciprocal through its locking pin bracket 31 carried in the bogie subframe side rail 7, as best seen in FIG. 4, the bracket assembly including annular bracket 31 and bracket plates 28a and 32 and the spring retainer element 33. Each bracket assembly is adjacent a spring 34 entrained between the spring retainer 33 and the spring retainer or back up channel 36, the spring 34 being on the pin shaft portion 35 of the locking pin 28, as best seen in FIG. 4. The pin bracket assembly is fixedly attached to the bogie side rail 7 by welding and is suitably apertured to define the aperture means 6a for reciprocal movement of its respective locking pin 28 therethrough.

The handle portion 14 of the handle 12 is provided with a transversely extending locking or positioning pin or latch pin 37, see FIGS. 3–6, which, when held in a horizontal position, may pass through slot 38c in the latch angle plate 38 mounted on and depending from the lower horizontal flange 8c of the bogie subframe crossmember 8. The angle plate 38 includes a vertical portion 38a and an upper horizontal flange portion 38b and the slot 38c includes a round slot portion 38d for passage of the handle portion 14 therethrough and an elongated end slot portion 38e for the passage of the latch pin 37 therethrough when the pin is in its horizontal position, the pin passing from the inside to the outside of the latch plate 38 as the handle is pulled outwardly against the action of the spring 34.

Dial assembly 39 is mounted on the handle 12 for rotation therewith, as best seen in FIG. 6, and includes flat vertical dial plate 39a which is disposed next to a fixed indicator member or plate 40 mounted on the outside of the bogie subframe rail 7. A dial tube or bracket 41 connects the dial plate 39a with the dial sprocket unit 42 and is constrained for movement therewith. The sprocket unit 42 includes a dial sprocket 43 about which is a chain 44 connecting with and extending about the star wheel sprocket 45c of the star wheel assembly 45. Constrained for movement with the star wheel sprocket 45c is a star wheel 45a which is provided with six star wheel points or tapered segments 45b. Adjacent the star wheel are stop blocks 46 (see FIGS. 2 and 3) which are mounted on the inside of the vertical surface of the bogie subframes for cooperation with means (not shown) mounted on the trailer underframe to prevent separation of the bogie frames from the trailer frames as is conventional practice.

When it is desired to reposition the sliding suspension or bogie assembly 3, it is necessary first to disengage both bogie frame mounted opposed locking pins 28 from their respective locating holes or aperture means 2a and 6a. These two locking pins, which are opposite one another, are located at the front end of the sliding frame or bogie assembly 3. To disengage the locking pins, the operator pulls on the handle assembly 12, imparting a counterclockwise force, as see in FIG. 3, to the outer end of the lower lever 20. This force creates a torque in the tubular section of the upper lever or pivot plate 24 which causes counterclockwise movement (see FIG. 3) of the pivot pin means 25 which fasten links 26 with the lower lever 20 causing tensile forces to be transmitted through the links 26 and through the pivot pin means 27 into the locking pins 28. These tensile forces in the locking pins 28 cause collars or spring retainers 33 to compress the springs 34, thereby permitting the tapered outer ends 29 of the locking pins 28 to retract within the limits of the frame or bogie rails 7.

When the handle 12 is pulled straight out away from the bogie subframe and trailer underframe rails, with the vertical handle end portion or hook in the vertically down position, the latch pin 37, which holds the outer square tubing portion 14 of the handle assembly 12 to the inner round shaft or rod 15, is free to pass through the slot 38c in the latch angle member 38. Once this pin 37 is through the slot 38c, twisting the hooked handle 14 and releasing the pull on the handle causes the pin 37 to become locked behind the latch angle plate 38, that is, between the latch plate 38 and the dial sprocket 43. When this happens, the locking pins 28 are locked in a retracted position with their springs 34 compressed and the slider or bogie unit 3 is free to be repositioned.

Let us assume that it is desired to move the slider bogie unit 3 seven bolster positions forward, that is, the bogie will slide or be repositioned from the rear end of the trailer toward the forward end the longitudinal distance spanned by seven trailer underframe bolsters 4. A reference to FIG. 6 shows that the dial is composed of an outer circular portion having an "F" thereon for "Forward" and having eight numbers or units spaced about its circular path and that there is further provided an adjacent inner circular portion labeled "R" for "Reverse" movement of the bogie unit that is divided into eight segments or units. Now, to move these seven bolster positions, we rotate the square tube handle portion 14 which, in turn, rotates the dial assembly 39 until graduation "7" lines up with the forward indicator position on the indicator 40 which is marked for forward and reverse positions. Since the locking pins 28 are retracted and their springs 34 are compressed, the forces in the system or apparatus hold the handle 12 in place. When the trailer brakes on the bogie assembly 3 are locked, the trailer is moved backward, which backward movement has the effect of moving the slider bogie arrangement 3 forward on the trailer 1. Each time a trailer underframe bolster 4 of the trailer underframe or chassis 2 passes over the star wheel 45a of the star wheel assembly 45, the wheel 45a is moved or rotated 1/6 of a revolution. The star wheel sprocket member 45c moves the ladder chain 44 which turns the dial sprocket 43 which is rigidly fastened to the dial assembly 39. Each 60° movement of the star wheel assembly 45 causes a 45° movement of the dial assembly 39 for rotating movement of the dial plate 39a. When the dial assembly moves, so does the handle portion 14. When seven bolsters 4 have passed over seven of the star wheel points of the star wheel assembly, the latch pin 37 bearing against the latch plate 38 has returned to a position where the pin 37 can automatically jump through the slot 38c since the pin 37 is in horizontal alignment with the slot portion 38c at this time. This allows locking pins 28 to impinge on the inner faces of fixed rails 5 of the trailer underframe 2 by extending through the aperture means 6a of the bogie subframe rails 7. As the trailer 1 continues moving, the locking pins 28 jump into the next pair of positioning holes or rail aperture means 2a that they encounter in the fixed rails 5 of the trailer underframe 2. Therefore, it is seen that the trailer underframe bolsters and the projections on the star wheel cooperate with one another to operate as dial operating means which, in turn, act with the chain and the dial sprocket acting as drive means to rotate the pin means mounted on the handle whereby the pin means in passing through the vertical slotted plate cooperates with the angle plate as locking pin control means.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A roadway vehicle apparatus comprising:

a trailer underframe including a pair of laterally spaced longitudinally extending rails, said rails having longitudinally spaced transversely aligned holes, a sliding bogie unit including a bogie subframe having a pair of laterally spaced longitudinally extending rail means slidably mounted with said rails, a locking assembly mounted on said bogie unit and including a pair of transversely extending opposing locking pin means on each side of the bogie unit and selectively engageable with one of the holes in each of said rails, biasing means urging each of said opposed locking pin means into its respective rail hole, rotatable handle means for transversely reciprocating each of said locking pin means in and out of a respective of said rail holes, dial structure including dial means constrained for rotational movement with said handle means to indicate positioning of the bogie unit with respect to the underframe, dial-operating means on the trailer underframe and the bogie unit for incremental positional movement of the dial means upon relative incremental movement between the underframe and the bogie unit, and locking pin control means on the bogie unit cooperative with the handle means in retaining the locking pins from entering the rail holes in opposition to the biasing means and cooperative with the dial-operating means upon relative movement between the underframe and the bogie unit allowing said locking pin means to enter said rail holes.

2. The invention according to claim 1, and said dial structure including a fixed dial unit mounted on the bogie unit, said dial means having positioning indicia thereon and said fixed dial unit having indicia thereon and cooperative with said dial means whereby the indicia on the dial means is indicative of the angular position of the handle means.

3. The invention according to claim 1, and said dial-operating means including a plurality of longitudinally spaced tranversely aligned bolsters on said underframe and star wheel means rotatably mounted on said bogie unit and engageable with the bolsters of the underframe upon movement of the underframe relative to the bogie unit, and drive means connecting the star wheel means with the dial means and operative to rotate the dial means upon rotation of the star wheel means.

4. The invention according to claim 1, and
said locking pin control means including pin means projecting from the handle means and pin retainer means carried by the bogie unit, said retainer means being provided with a slot for passage of the pin means therethrough in one rotated angular position of the handle means attendant to movement of the locking assembly between a locked position of the bogie unit with the trailer underframe to an unlocked position of the bogie unit with the underframe.

5. The invention according to claim 1, and
said dial structure including a fixed dial unit mounted on the bogie unit,
said dial means having positioning indicia thereon and said fixed dial unit having indicia thereon and cooperative with said dial means whereby the indicia on the dial means is indicative of the angular position of the handle means,
said dial-operating means including a plurality of longitudinally spaced transversely aligned bolsters on said trailer underframe and star wheel means rotatably mounted on said bogie unit and engageable with the bolsters of the underframe upon movement of the underframe relative to the bogie unit, and
drive means connecting the star wheel means with the dial means and operative to rotate the dial means upon rotation of the star wheel means.

6. The invention according to claim 1, and
said dial structure including a fixed dial unit mounted on the bogie unit,
said dial means having positioning indicia thereon and said fixed dial unit having indicia thereon and cooperative with said dial means whereby the indicia on the dial means is indicative of the angular position of the handle means,
said locking pin control means including pin means projecting from the handle means, and pin retainer means carried by the bogie unit, said retainer means being provided with a slot for passage of the pin means therethrough in one rotated angular position of the handle means attendant to movement of the locking assembly between a locked position of the bogie unit with the trailer underframe to an unlocked position of the bogie unit with the underframe.

7. The invention according to claim 1, and
said dial-operating means including a plurality of longitudinally spaced transversely aligned bolsters on said trailer underframe and star wheel means rotatably mounted on said bogie unit and engageable with the bolsters of the underframe upon movement of the underframe relative to the bogie unit,
drive means connecting the star wheel means with the dial means and operative to rotate the dial means upon rotation of the star wheel means,
said locking pin control means including pin means projecting from the handle means and pin retainer means carried by the bogie unit, said retainer means being provided with a slot for passage of the pin means therethrough in one rotated angular position of the handle means attendant to movement of the locking assembly between a locked position of the bogie unit with the trailer underframe to an unlocked position of the bogie unit with the underframe.

8. The invention according to claim 1, and
said dial-operating means including a plurality of longitudinally spaced members on the trailer underframe and wheel means having a plurality of projections complemental to the underframe members, said wheel means being rotatably mounted on the bogie unit whereby a respective projection may be engageable with a respective member upon movement of the underframe relative to the bogie unit, and
drive means connecting the wheel means with the dial means and operative to rotate the dial means in accordance with the rotation of the wheel means.

9. A roadway vehicle apparatus comprising:
a trailer underframe,
a bogie unit slidably mounted with respect to the trailer underframe,
a locking assembly mounted on the bogie and selectively locking the bogie unit to the trailer underframe at selected positions of the bogie unit along the underframe.
rotatable handle means for reciprocally moving the locking assembly between locked and unlocked positions of the bogie unit and underframe,
dial structure including dial means constrained for rotational movement with said handle means to indicate positioning of the bogie unit with respect to the underframe,
dial-operating means on the underframe and on the bogie unit for incremental positional movement of the dial means upon relative incremental movement between the underframe and the bogie unit, and
locking assembly control means on the bogie unit connecting with the handle means and cooperative with the handle means in retaining the locking assembly from moving to the locking position and cooperative with the dial-operating means upon relative movement between the underframe and the bogie unit allowing the locking assembly to move into the locking position.

10. The invention according to claim 9, and
said dial-operating means including a plurality of longitudinally spaced members on the trailer underframe and wheel means having a plurality of projections complemental to the underframe members, said wheel means being rotatably mounted on the bogie unit whereby a respective projection may be engageable with a respective member upon movement of the underframe relative to the bogie unit, and
drive means connecting the wheel means with the dial means and operative to rotate the dial means in accordance with the rotation of the wheel means.

11. The invention according to claim 9, and
said dial structure including a fixed dial unit mounted on the bogie unit,
said dial means having positioning indicia thereon said fixed dial unit having indicia thereon and cooperative with said dial means whereby the indicia on the dial means is indicative of the angular position of the handle means.

12. The invention according to claim 9, and
said dial-operating means including a plurality of longitudinally spaced transversely aligned bolsters on said underframe and star wheel means rotatably mounted on said bogie unit and engageable with the bolsters of the underframe upon movement of the trailer underframe relative to the bogie unit, and drive means connecting the star wheel means with the dial means and operative to rotate the dial means upon rotation of the star wheel means.

13. The invention according to claim 9, and
said locking assembly control means including pin means projecting from the handle means and pin retainer means carried by the bogie unit, said retainer means being provided with a slot for passage of the pin means therethrough in one rotated angular position of the handle means attendant to movement of the locking assembly between a locked position of the bogie unit with the trailer underframe to an unlocked position of the bogie unit with the underframe.

14. The invention according to claim 9, and
said rotatable handle means connecting with said locking assembly and moving said locking assembly in a reciprocating manner transversely of the vehicle, said handle means being rotatable about the transverse axis of said reciprocation and said control means including a projection on the handle means and a member mounted on the bogie and allowing for passage of the projection through a slot in the member at a particular rotation of the handle means whereby the handle means may be reciprocally moved into the unlocked position for permitting relative movement between the trailer underframe and the bogie unit, and biasing means holding the pin means against the member until such time said handle means is rotated by said dial-operating means for passage of the handle pin through the slot for placing the handle means in the locking position, said dial means indicating the movement of the bogie with respect to the trailer underframe in the locking position of the handle means.

15. The invention according to claim 9, and
said rotatable handle means connecting with said locking assembly and moving said locking assembly in a reciprocating manner transversely of the vehicle, said handle means being rotatable about the transverse axis of reciprocation and said control means including a projection on the handle means and a member mounted on the bogie and allowing for passage of the projection through a slot in the key member at a particular rotation of the handle means whereby the handle means may be reciprocally moved into the unlocked position for permitting relative movement between the trailer underframe and the bogie unit.

16. The invention according to claim 15, and
biasing means holding the pin means against the member until such time said handle means is rotated by said dial-operating means for passage of the handle pin through the slot for placing the handle means in the locking position, said dial means indicating the movement of the bogie with respect to the trailer underframe in the locking position of the handle means.

\* \* \* \* \*